United States Patent [19]

Morihara et al.

[11] Patent Number: 5,725,615
[45] Date of Patent: Mar. 10, 1998

[54] ENTRAINED BED COAL GASIFICATION REACTOR AND METHOD OF GASIFYING COAL

[75] Inventors: Atsushi Morihara, Hitachinaka; Takanori Kudo, Hitachi; Sinji Tanaka, Jyuou-machi; Shuntaro Koyama, Hitachinaka; Eiji Kida, Hiroshima, all of Japan

[73] Assignees: Hitachi, Ltd.; Babcock-Hitachi Kabushiki Kaisha, both of Tokyo, Japan

[21] Appl. No.: 537,438

[22] Filed: Oct. 2, 1995

[30] Foreign Application Priority Data

Oct. 5, 1994 [JP] Japan .................. 6-241003

[51] Int. Cl.$^6$ ............................ C10J 6/38
[52] U.S. Cl. ............ 48/77; 48/86 R; 48/101; 48/106; 48/107; 48/210
[58] Field of Search ............ 48/77, 86 R, 101, 48/106, 107, 210, DIG. 2

[56] References Cited

U.S. PATENT DOCUMENTS

| | | |
|---|---|---|
| 4,319,888 | 3/1982 | Blaskowski .................. 48/77 |
| 4,569,680 | 2/1986 | Darling et al. .................. 48/77 |
| 4,680,035 | 7/1987 | Tanca .................. 48/77 |
| 4,773,917 | 9/1988 | Morihara et al. .................. 48/77 |

FOREIGN PATENT DOCUMENTS

| | | |
|---|---|---|
| 59-172589 | 9/1984 | Japan . |
| 63-297736 | 12/1988 | Japan . |
| 4-342832 | 11/1992 | Japan . |

*Primary Examiner*—Timothy McMahon
*Attorney, Agent, or Firm*—Fay, Sharpe, Beall, Fagan, Minnich & McKee

[57] ABSTRACT

According to the apparatus and method, combustible gas having a stable composition can be formed even if the load is charged. Burners are provided in the upper and the lower regions of an entrained bed coal gasification reactor. The temperature of the product gas is kept low in the upper region and high in the lower region. The volumes of the upper and lower regions are changed to meet the load so that the rate of heat loss becomes constant even if the load changes. Since the rate of heat loss can be kept constant and consequently variation of the composition of the product gas can be suppressed small, the efficiency of the coal gasification electric power generating system can be kept constant.

29 Claims, 7 Drawing Sheets

50%

75%

100%

ENTRAINED BED COAL GASIFICATION REACTOR AND METHOD OF GASIFYING COAL

BACKGROUND OF THE INVENTION

1. Field of the Invention

The present invention relates to an entrained bed coal gasification reactor and a method of gasifying coal, and further relates to a fuel cell electric power generation system and a combined electric power generation system having an entrained bed coal gasification reactor.

More particularly, the present invention relates to an entrained bed coal gasification reactor and a method of gasifying coal capable of forming a combustible gas having a constant composition so that an electric power generation device such as gas turbine, fuel cell or the like can maintain stable performance even when the load of the whole electric power generation plant is varied corresponding to a generating command.

2. Description of the Related Art

A coal gasification reactor is an apparatus for forming a combustible gas composed of hydrogen, carbon monoxide, methane, and some other gases by contacting coal to an oxidizer such as oxygen or air at a high temperature. Among the various kinds of coal gasification reactors, an entrained bed coal gasification reactor is a reactor type suitable for environmental protection since the entrained bed coal gasification reactor can perform the reaction of coal and oxidizer speedily to improve the efficiency of coal gasification, and at the same time melts the ash contained in the coal and encloses the harmful metals contained in coal ash.

When the load, that is, the coal flow rate is varied in a coal gasification reactor, the heat loss is changed depending on the load. The reason is that even if the load is decreased in the same reactor, the surface area inside the reactor is constant and the amount of heat absorption is kept unchanged. Therefore, the heat generating rate is decreased depending on the decrease in the coal flow rate and consequently the ratio of heat loss is relatively increased. Thereby, both of the composition of the product gas and the heat generating rate are also changed. The change in the characteristics such as composition of the product gas, heat generating rate and so on make the combustion of the gas turbine unstable and the performance of the fuel cell unstable. Therefore, the operability, the efficiency and the reliability of the whole system are decreased. Additionally, a long time is required to settle the whole system to a stable state since the composition of the product gas is not stabilized, which leads to a problem in load-following capability.

In order to solve these problems, a method of gasifying coal is proposed in Japanese Patent Application Laid-Open No.59-172589 (1984). The disclosed method is that the ratio of oxygen flow rate supplied to the upper burner of an entrained bed gasification reactor to the supplying rate of coal is set so that the temperature does not exceed the coal ash melting point, and the ratio of oxygen flow rate supplied to the lower burner to the supplying rate of coal is set larger than that for the upper burner so that the temperature exceeds the coal ash melting point. Another method of gasifying coal is proposed in Japanese Patent Application Laid-Open No.63-297736 (1988). According to this method, coal is fed to the upper region and the lower region of an entrained bed gasification reactor with ratio of 1-to-1, and the ratio of oxidizer flow rate to the coal flow rate supplied to the lower region is kept at a constant value so that the temperature can be kept above the coal melting point and the ratio of oxidizer flow rate to the coal flow rate supplied to the upper region is controlled within a range so that the temperature does not exceed the coal melting point to cope with a load fluctuation condition. Further, a method of coping with an abnormal state by mixing gas formed by coal gasification with liquid fuel is proposed in Japanese Patent Application Laid-Open No.4-342832 (1992).

Although the methods of entrained bed gasification disclosed in Japanese Patent Application Laid-Open No.59-172589 (1984) and in Japanese Patent Application Laid-Open No.63-297736 (1988) are effective for coping with a load fluctuation condition, there are some problems in properly following a load fluctuation condition since the heat loss is not considered.

The method disclosed in Japanese Patent Application Laid-Open No.4-342832 (1992) requires an auxiliary facility and makes the system complex.

SUMMARY OF THE INVENTION

A first object of the present invention is to provide an entrained bed coal gasification reactor capable of properly coping with a load fluctuation condition by controlling heat loss in the coal gasification reactor.

A second object of the present invention is to provide an entrained bed coal gasification reactor capable of properly coping with a load fluctuation condition by controlling heat loss in the coal gasification reactor without a large auxiliary facility such as a liquid fuel storage.

A third object of the present invention is to provide a method of entrained bed coal gasification for realizing the first object.

A fourth object of the present invention is to provide a method of entrained bed coal gasification for realizing the second object.

A fifth object of the present invention is to provide an electric power generating system having an entrained bed coal gasification reactor realizing the first and the second objects.

The first and the second objects of the present invention can be attained by providing an entrained bed gasification reactor comprising burners for forming combustible gas by injecting coal and oxidizer into two systems of an upper and a lower gasification chambers, a slag ejection port for reducing the cross-section area at the bottom, and coal-oxidizer flow rate control means for setting the ratio of the coal to the oxidizer supplied to the upper burner to such a value that the temperature does not exceed the melting temperature of the coal ash and setting the ratio of the coal to the oxidizer supplied to the lower burner to such a value that the temperature exceeds the melting temperature of the coal ash, which further comprises reaction region control means for changing the ratio of the volume of an upper reaction region formed by the upper burner to the volume of a lower reaction region formed by the lower burner depending on the load so that the ratio of the volume of the lower reaction region is increased as the load increases.

Similarly, the first and the second objects of the present invention can be attained by providing an entrained bed gasification reactor comprising burners for forming combustible gas by injecting coal and oxidizer into two systems of the upper region and the lower region of a gasification chamber, each of the plural upper burners and the plural lower burners being directed in the tangential direction of the gasification chamber to form swirl flow, a product gas ejection port reducing the cross-sectional area at the top of the gasification chamber, a slag ejection port reducing the cross-sectional area at the bottom, a coal/oxidizer flow rate control means for setting the ratio of the coal and oxidizer supplied to the upper burners so that the temperature does not exceed the coal ash melting temperature and setting the ratio of the coal and oxidizer supplied to the lower burners so that the temperature exceeds the coal ash melting temperature, and further comprising a reaction region control means for changing the ratio of the volume of an upper reaction region formed by the upper burners to the volume of a lower reaction region formed by the lower burners depending on the load in such a manner that the ratio of the lower reaction region is increased as the load increases.

As the reaction region control means, the following means (a) to (d) may be employed.

(a) a means for changing the ratio of the swirl forces by the upper burners to the lower burners depending on the load so that the swirl force by the lower burners is strengthened as the load increases.

(b) a means for changing the ratio of the flow rate of the coal supplied to the upper burners to the flow rate of the coal supplied to the lower burners so that the ratio of the flow rate of the coal supplied to the lower burners is increased as the load increases.

(c) a means for changing the ratio of the injecting speed of the coal and oxidizer supplied to the upper burners to the injecting speed of the coal and oxidizer supplied to the lower burners depending on the load so that the injecting speed of the coal and oxidizer supplied to the lower burners is increased as the load increases.

(d) a means for keeping the oxidizer-to-coal ratio as a whole in such a manner that the oxidizer-to-coal ratio supplied to the upper burners is kept constant and the oxidizer-to-coal ratio supplied to the lower burner is decreased as the load increases by increasing the ratio of the flow rate of the coal supplied to the lower burners and decreasing the ratio of the flow rate of the coal supplied to the upper burners.

Instead of the above means (a) to (d) or together with the above means (a) to (d), the following means (e) and (f) may be employed.

(e) a steam nozzle provided near the lower burners, and a means for changing the flow rate of the steam supplied to the steam nozzle depending on the load so that the flow rate of the steam is increased as the load increases. In this case, although it is necessary to install the steam nozzle, the first object of the present invention can be attained.

(f) an air nozzle provided near the lower burners, and a means for changing the flow rate of the air supplied to the air nozzle depending on the load so that the flow rate of the air is increased as the load increases. In this case, although it is necessary to install the steam nozzle, the first object of the present invention can be also attained.

The third and the fourth objects of the present invention can be attained by providing a method of entrained bed gasification in which coal and oxidizer are injected from two systems of burners provided at each of the upper region and the lower region of a gasification chamber having a product gas ejecting port reducing the cross-sectional area in the top and a slag ejecting port reducing the cross-sectional area in the bottom, the coal and the oxidizer are reacted to form combustible gas by setting the oxidizer-to-coal ratio to the upper burner so that the temperature does not exceed the coal ash melting temperature and by setting the oxidizer-to-coal ratio to the lower burner so that the temperature exceeds the coal ash melting temperature, wherein the ratio of the volume of an upper reaction region formed by said upper burner to the volume of a lower reaction region formed by said lower burner is changed depending on the load so that the ratio of the volume of the lower reaction region is increased as the load increases.

Further, the third and the fourth objects of the present invention can be attained by providing a method of entrained bed gasification in which coal and oxidizer are injected from two systems of burners provided at each of the upper region and the lower region of a gasification chamber having a product gas ejecting port reducing the surface area in the top and a slag ejecting port reducing the cross-sectional area in the bottom, the coal and the oxidizer are reacted to form combustible gas by setting the oxidizer-to-coal ratio to the upper burner so that the temperature does not exceed the coal ash melting temperature and by setting the oxidizer-to-coal ratio to the lower burner so that the temperature exceeds the coal ash melting temperature, wherein the ratio of the volume of an upper reaction region formed by the upper burners to the volume of a lower reaction region formed by the lower burners is changed depending on the load in such a manner that the ratio of the lower reaction region is increased as the load increases.

In order to change the volumes of the upper and the lower reaction regions, the method controlling the ratio of swirl forces, the ratio of coal flow rates, the ratio of injecting speed of coal-and-oxidizer or the like described in the items (a) to (d) may be applied.

It is possible to apply the method described in the above item (e) where a steam nozzle provided near the lower burners, and a means for changing the flow rate of the steam supplied to the steam nozzle depending on the load so that the flow rate of the steam is increased as the load increases.

It is also possible to apply the method described in the above item (f) where an air nozzle provided near the lower burners instead of the steam nozzle, and a means for changing the flow rate of the air supplied to the air nozzle depending on the load so that the flow rate of the air is increased as the load increases.

By these cases, the fourth object of the present invention can be also attained.

The fifth object of the present invention can be attained by a coal gasification fuel cell electric power generating system comprising a coal gasification reactor and a fuel cell electric power generation device for generating electric power using the combustible gas formed by the gasification reactor, which comprises an entrained bed gasification reactor described above as the coal gasification reactor. Otherwise, the fifth object of the present invention can be attained by a coal gasification combined electric power generating system comprising a coal gasification reactor and a combined electric power generation device for generating electric power where the combustible gas formed by the gasification reactor is burned in a gas turbine and the thermal energy having the burned gas is used for driving a steam turbine, which comprises an entrained bed gasification reactor described above as the coal gasification reactor.

The common point in the present invention is that the heat value of the product gas is kept constant by actively controlling the heat loss in the gasification reactor. In the entrained bed gasification method, a thermal insulation layer with coal is formed between the reactor wall and the reaction region. The heat released from the reactor wall is controlled by varying the thermal insulation layer depending on the load to keep the heat loss constant in order to keep the heat value of the product gas at constant value.

The basic gasification reactions of coal are expressed by the following chemical reaction equations.

$$Coal \rightarrow Gases\ (CH_4, CO, H_2) + Char\ (C) \quad (1)$$

$$Char\ (C) + H_2O \rightarrow CO + H_2 \quad (2)$$

$$Char\ (C) + CO_2 \rightarrow 2CO \quad (3)$$

$$(Coal, Char) + CO_2 \rightarrow CO + CO_2 \quad (4)$$

Among the reactions, the reactions expressed by the equations (1), (2) and (3) are endothermic reactions, and the reaction expressed by the equation (4) is an exothermic reaction. In general, volatile components are initially formed according to the equation (1) to produce char and at the same time to burn the volatile components to raise the temperature of the atmosphere. At nearly the same time, coal and oxygen directly react according to the equation (4) also to raise the temperature of the atmosphere and at the same time to form CO and $CO_2$. The $H_2O$, $CO_2$ formed by the combustion of the volatile components are react with char under a high temperature atmosphere as shown by the equations (2) and (3) to form combustible gases of $H_2$ and CO. In the entrained bed gasification reactor, in the reaction process the ash contained in coal is melted to be extracted in a form of liquid slug by keeping the reactor temperature high enough to melt the ash in coal and to enclose the harmful metals in the vitrified ash.

In the entrained bed gasification reactor of two region gasification type, coal and a small amount of oxidizer are supplied from the upper region of the coal gasification reactor and coal and a large amount of oxidizer are supplied from the lower region. The gasification reaction is performed so that the lower region is kept at a temperature high enough to melt the ash and the upper region is kept at a temperature not to melt the ash in coal. Therewith, the gasification reaction can be sufficiently performed and at the same time sticking of the ash to the reactor wall in the upper portion of the reactor can be suppressed, which leads to the compatibility of handling of the ash and attaining of a high efficiency.

In the two region gasification type, the heat loss is determined by the stages of reaction in each of the upper and the lower regions. Although the heat loss in each of the regions is determined by the reactor temperature, the surface temperature and the surface area in the region generating heat, the rate of the total heat loss can be kept constant by changing the ratio of the contact surfaces between both of the reaction regions. That is, the heat loss is roughly expressed by the following equation.

$$Q = k \cdot A (T^4 - T_w^4) \quad (5)$$

where, Q is absorbed heat, A is surface area, T is temperature of the reactor, $T_w$ is surface temperature of the reactor. k is the radiation coefficient. When the temperature difference is large, the absorbed heat is large and exothermic reaction takes place, and most part of the total heat loss is occurs in the lower region where the gas temperature is high. Therefore, during a low load it is possible to attain a certain heat loss by decreasing the heat transfer area corresponding to the lower reaction region to reduce the heat loss.

DETAILED DESCRIPTION OF THE PREFERRED EMBODIMENTS

Figure 1:
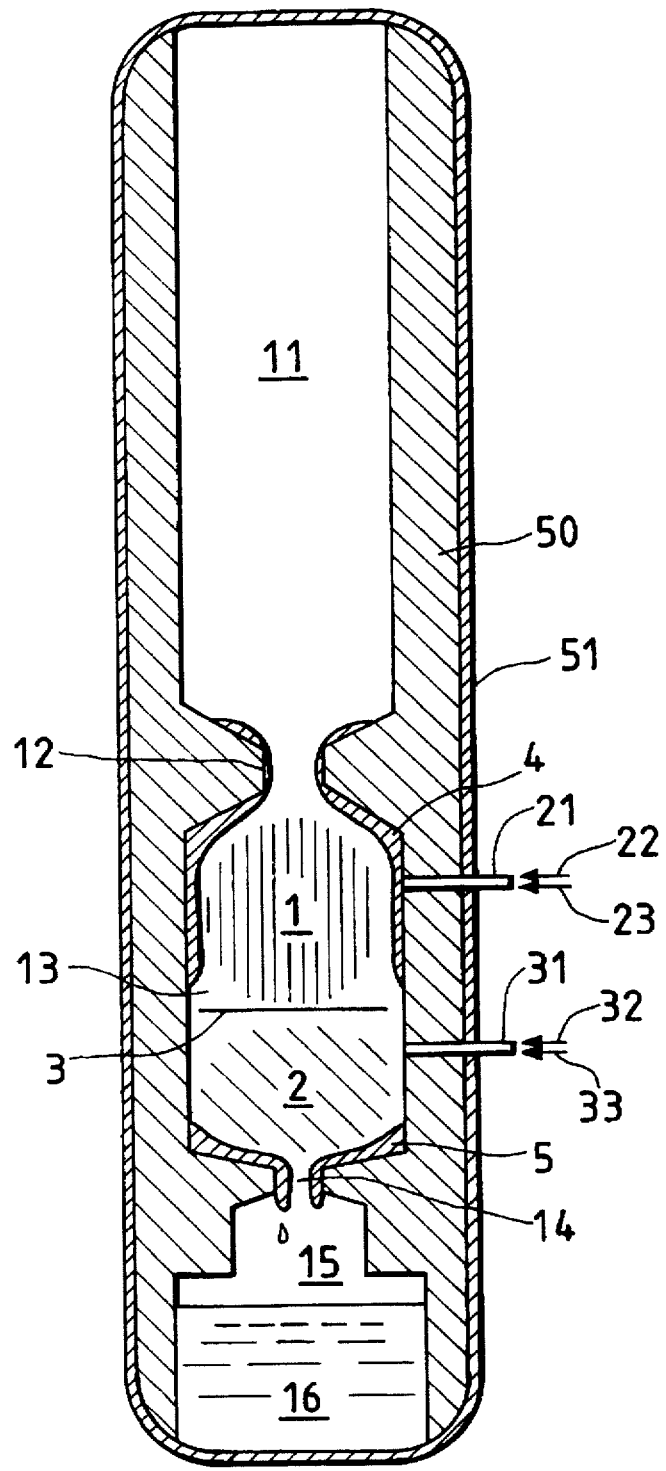
FIG. 1 is a cross-sectional vertical view of an embodiment of a coal gasification reactor in accordance with the present invention.

An embodiment of the present invention will be described below, referring to FIG. 1.

The gasification reactor is a cylindrical reactor made of a heat-resistant wall 50 surrounded with vessel 51. The whole gasification reactor is constructed by a gas cooling chamber 11 in the top portion of the reactor, a slag cooling chamber 15 in the bottom portion of the reactor and a gasification chamber 13. The reactor wall of the gasification chamber 13 has two systems of the upper and the lower burners for injecting coal and oxidizer. Both of the upper burner 21 and the lower burner 31 are preferably installed along a tangential direction so as to form swirl flow. It is also preferable to provide plural burners in each of the upper and the lower regions. The swirl directions by the upper and the lower burners should be the same. The cross-sectional area between the gasification chamber and the gas cooling chamber is reduced with a reducing portion 12. Similarly, the cross-sectional area between the gasification chamber and the slag cooling chamber, that is, a slag tap 14 is also reduced. A slag cooling tank 16 is provided in the slag cooling chamber. Coal and oxidizer are supplied to the upper burner and the lower burner. Finely crushed and pulverized coal is used as the coal, and oxygen or air is used as the oxidizer. In this embodiment, air is used. In order to transfer the coal to the burners, an inert gas such as nitrogen is used as the carrier gas. The reference character 22 in FIG. 1 indicates oxygen supplied to the upper burner, and the reference character 23 indicates coal. Similarly, the reference character 32 indicates oxygen supplied to the lower burner, and the reference character 33 indicates coal. An upper reaction region 1 is formed the upper burner, and a lower reaction region 2 is formed by the lower burner. The volumes of the upper and the lower reaction regions are varied depending on the load. In FIG. 1, the boundary between the upper and the lower reaction regions is schematically indicated by the reference character 3.

Coal and oxidizer are supplied from the upper burner 21 by setting the coal-to-oxidizer ratio so as not to melt the ash in the coal. Since the melting point of ash in coal is, generally, near 1400° C. or slightly higher than 1400° C., it is preferable to control the temperature not to exceed 1400° C. Coal and oxidizer are supplied from the lower burner by setting the coal-to-oxidizer ratio so as to melt the ash in the coal. The temperature of the reaction region can be raised by increasing the oxidizer-to-coal ratio. It is described in Japanese Patent Application Laid-Open No.59-172589 (1984) that the temperature around the upper burner can be at 1310° C. by setting the ratio (oxygen supplying rate/coal supplying rate) to the upper burner to 0.36 to 0.38 (kg/kg) and the temperature around the lower burner can be at 1880° C. by setting the ratio (oxygen supplying rate/coal supplying rate) to the lower burner to 1.26 to 1.28 (kg/kg). In the present invention, it is also possible to set the ratio (oxygen supplying rate/coal supplying rate) to the upper burner. However, it is preferable to always set the ratio (oxygen supplying rate/coal supplying rate) as the whole of the upper and the lower burners to a constant value independently of change of the load.

By setting the oxygen-to-coal ratio to the upper burner so that the temperature does not exceed the ash melting point, the upper reaction region 1 having a temperature lower than the ash melting point is formed in the upper portion of the gasification chamber, and un-burned char 4 remains on the surface of the reactor wall in this region. The lower reaction region 2 having a temperature higher than the ash melting point is formed in the lower portion of the gasification chamber, and melted slug 5 is attached on the surface of the reactor wall in this region to flow down to the slag cooling chamber. The melted slag has a high thermal conductivity, and the melted slag itself does not have heat absorbing capability since the slag is already melted. Therefore, the heat loss in the lower reaction region is large.

On the other hand, since the temperature in the upper reaction region 1 is low, the heat loss from the reactor wall in the upper reaction region is less than that in the lower reaction region. Although the heat in the upper reaction region is initially transferred to the un-burned char 4, the heat is absorbed by the gasification reaction of the un-burned char as endothermic heat to be used for converting to the combustible gas. Therefore, this heat does not become the heat loss from the reactor wall.

Figure 2:
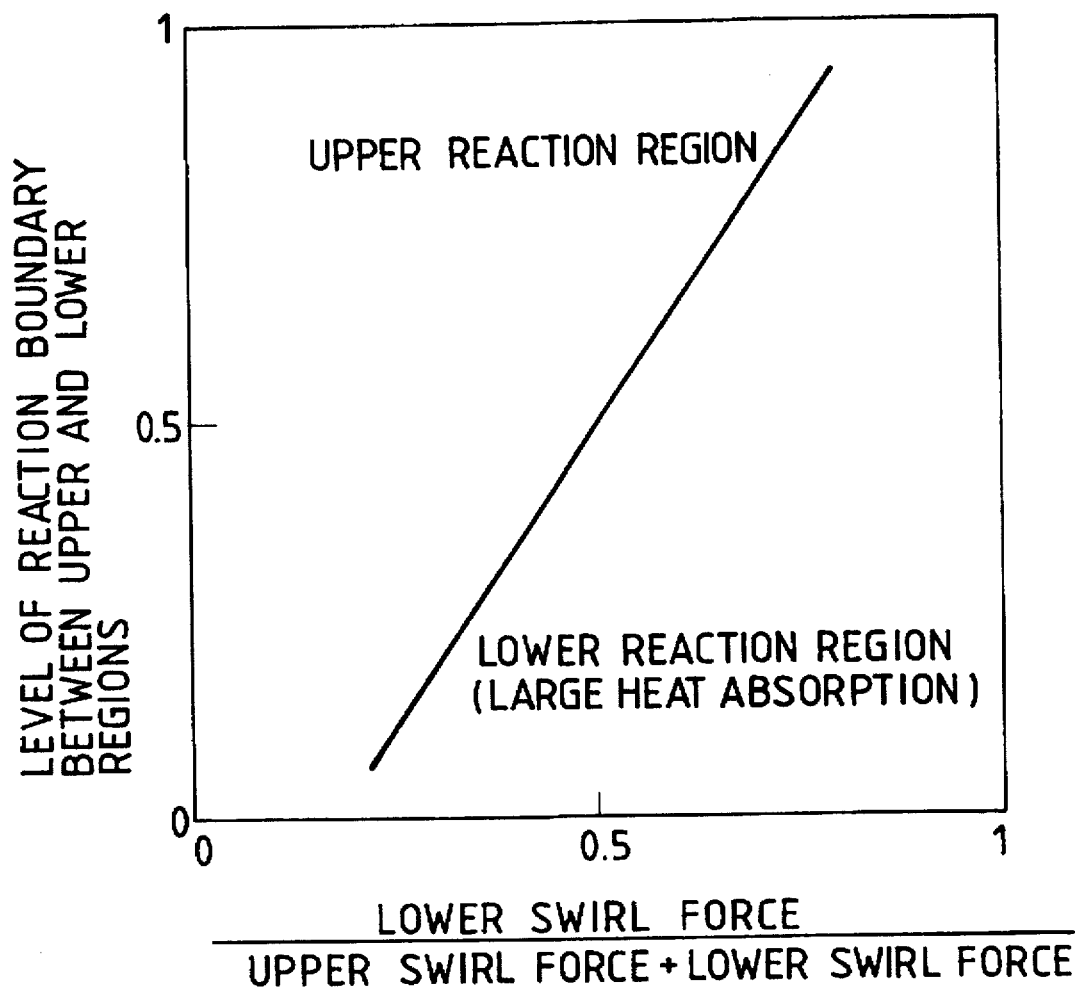
FIG. 2 is a graph showing the effect of swirl force on the sizes of an upper region and a lower reaction region.

The method of changing the heat transfer area by changing the resting region of the un-burned char 4 will be described below. Although the total heat transfer area is constant since the same reactor is used, it is possible to change the areal ratio facing to the lower reaction region 2 which is dominant in the total heat loss. FIG. 2 shows the characteristic of change in the volumes of the upper and the lower reaction regions. The abscissa is the ratio of the swirl force in the lower region to the total swirl force, and the ordinate is the reaction boundary between the upper reaction region and the lower reaction region, and both are expressed by non-dimensional values. The swirl force is obtained from the product of the burner injecting speed, the injecting mass velocity and the radius of swirl. It is clear from FIG. 2 that when the swirl force in the lower region is increased, the volume of the lower region increases.

Figure 3:
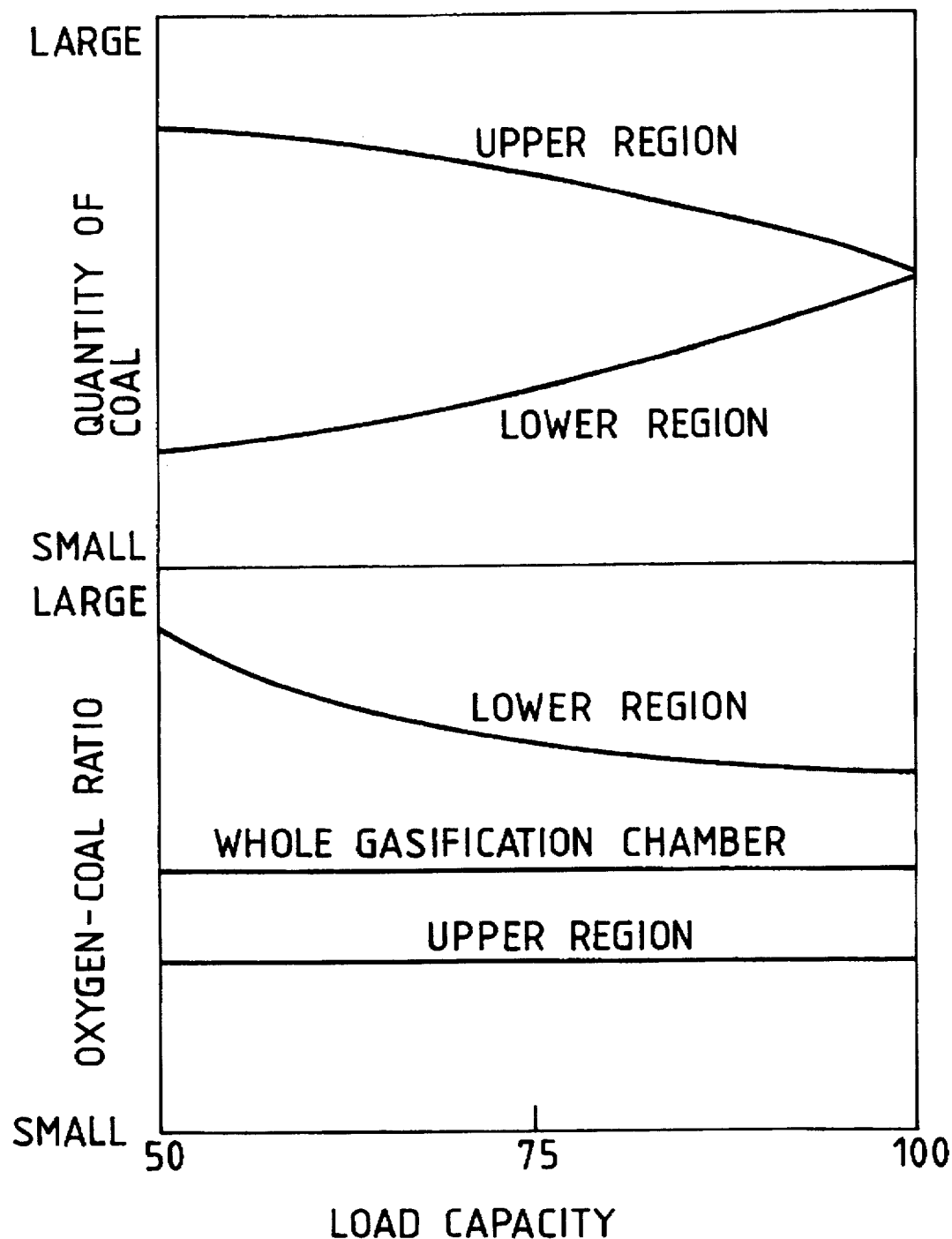
FIG. 3 is a graph showing the relationship between the load and the ratio of the oxygen flow rate to the coal flow rate, and between the load and the coal flow rate.
Figure 4A:
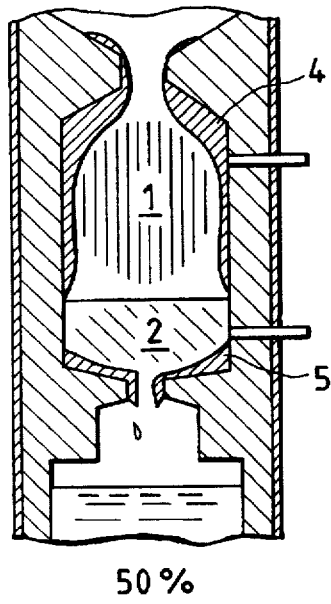
FIGS. 4(a), 4(b) and 4(c) are explanatory views showing the sizes of the upper and the lower reaction regions changing depending on the load.
Figure 4B:
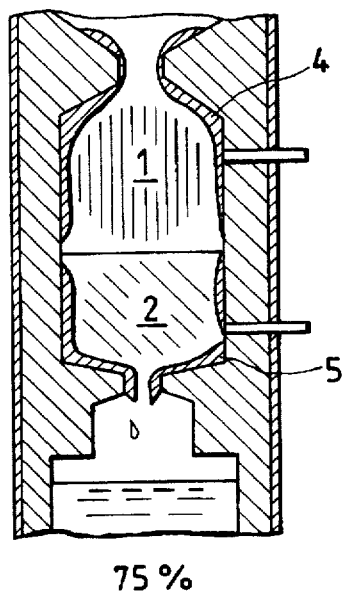
Figure 4C:
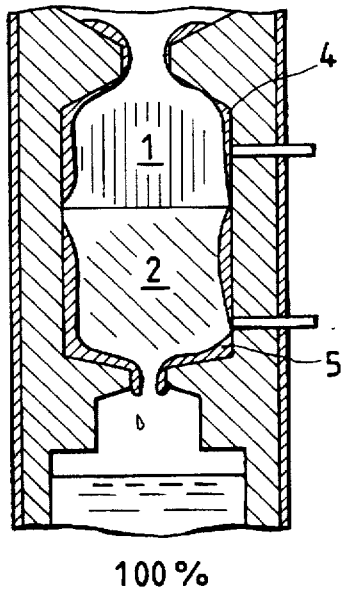

FIG. 3 shows the characteristic of changes in the coal flow rates and the ratios of oxygen-to-coal supplied to the upper burner and the lower burner. The ratio of oxygen-to-coal supplied to the upper burner is kept constant, and the ratio of oxygen-to-coal supplied to the whole of the upper burner and the lower burner is also kept constant. FIG. 4 shows the change of the state inside the gasification reactor caused by the operation of FIG. 3. When the coal flow rate supplied to the upper burner is decreased and the coal flow rate supplied to the lower burner is increased as the load is changed to 100%, 75%, 50% of maximum load, the volume of the upper reaction region is gradually increased and the volume of the lower reaction region covered by the melting slag 5 having a large heat absorption is gradually decreased as shown by (a), (b) and (c). Therewith, since the heat absorption is decreased as the heat supply to the whole reactor is decreased, the heat loss is kept constant and consequently the composition of the product gas does not change even when the load of the reactor is decreased. As the special effect of this embodiment, the ratio of oxygen to coal supplied to the lower burner is increased as the load decreases, the combustion rate in the lower portion of the reactor is increased to prevent decrease of the temperature. Therefore, the temperature required for flowing-down of the slug can be kept.

Figure 5:
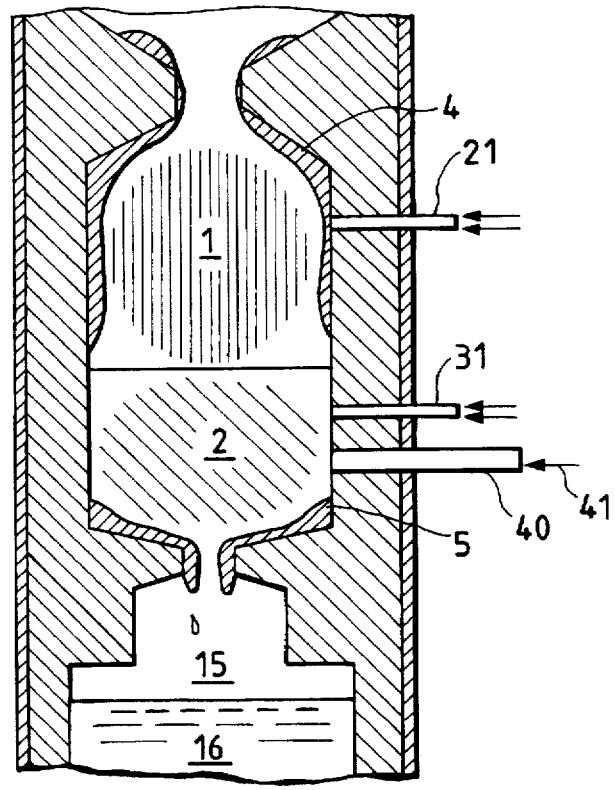
FIG. 5 is a cross-sectional vertical view of another embodiment of a coal gasification reactor in accordance with the present invention.

FIG. 5 shows an embodiment having a steam nozzle 40 for giving swirl force by supplying steam jet near the lower burner.

Although an ordinary operation is performed in a low load state, the steam 41 is supplied when the load is increased. This operation may be performed together with the operation of FIG. 3. By doing so, the same effect as shown in FIG. 4 can be obtained. The special effect of this embodiment is in that an abnormal temperature rise in the lower region due to increase of the load can be suppressed by supplying the steam 41, and the gasification efficiency is increased by reaction of the steam itself.

An air nozzle may be installed instead of the steam nozzle in FIG. 5. By doing so, the same effect as using the steam nozzle can be obtained. The special effect of this case is in that since the air is supplied to the lower region of the reactor when the load is increased, the power required for producing oxygen can be decreased.

Figure 6:
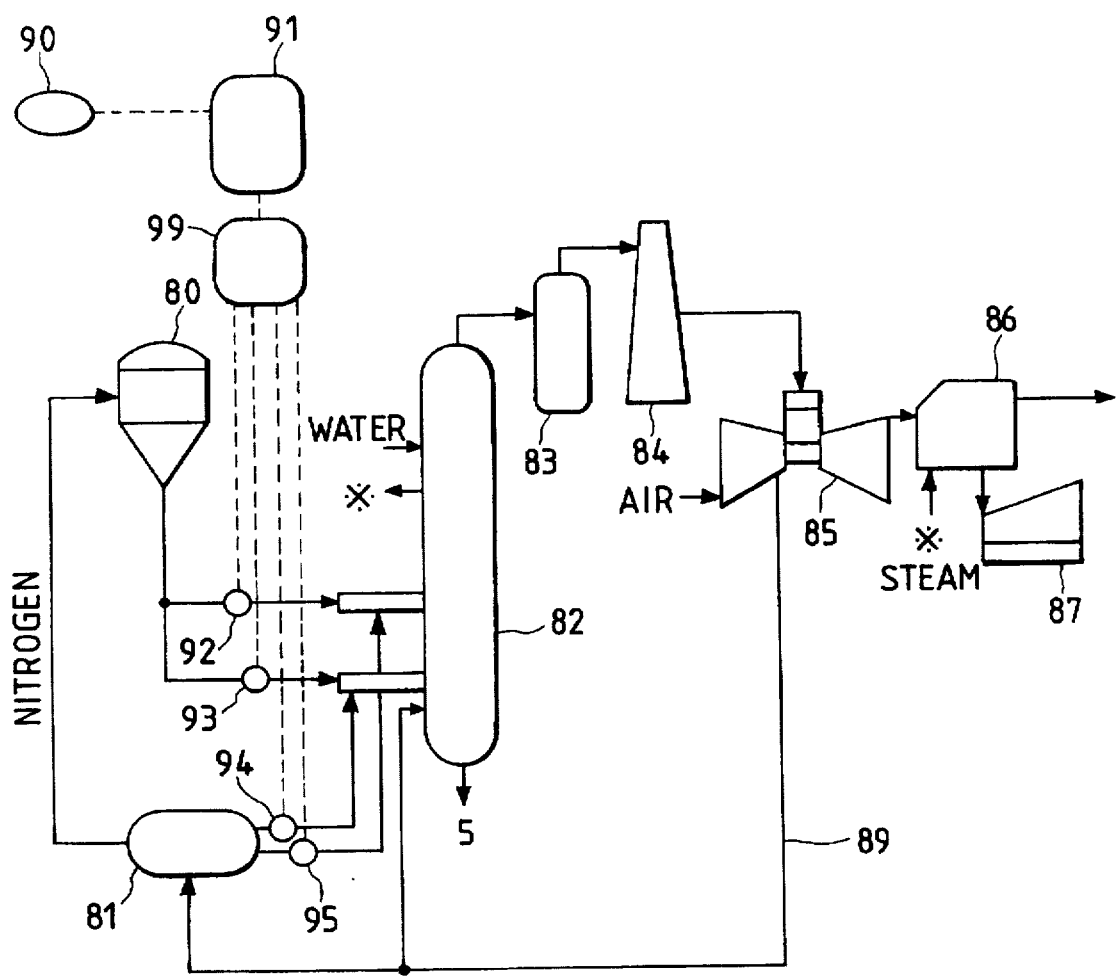
FIG. 6 is a diagram showing the construction of an embodiment of a coal gasification combined electric power generating system in accordance with the present invention.

FIG. 6 shows an embodiment of a combined electric power generating system having a coal gasification reactor. This system is composed of a coal gasification reactor 82, a gas turbine 85, a steam turbine 87, a coal/oxidizer flow rate control means 99, a reaction region control means 91 of the gasification reactor and so on. The product gas formed in the coal gasification reactor 82 passes through a scrubber 83 and a desulfurizer 84 to remove dust and sulphur in the product gas, and then burned in the gas turbine 85 to generate electric power. The exhaust gas passes through a heat recovery boiler 86 to generate steam and the produced steam generate electric power with the steam turbine 87. In this embodiment, water is turned into steam in the gasification reactor 82 and the steam is transferred to the heat recovery boiler 86. Compressed air 89 produced by a compressor of the gas turbine 85 is transferred to an oxygen generating equipment 81 to be separated into nitrogen and oxygen. The nitrogen is used for the pressurizing nitrogen at a coal hopper 80, and the oxygen is used as the oxidizer for the gasification reactor. There are some cases where a part of the pressurized air is directly supplied to the gasification reactor from a position near the lower burner of the gasification reactor to change the volumes of the upper and the lower reaction regions of the gasification reactor. A reaction region control means 91 determines coal flow rates supplied to the upper and the lower burners corresponding to a load command. The signal is transmitted to a coal-oxidizer flow rate control means 99 to determine the coal supplying rate and the ratio of oxidizer weight to coal weight supplied to the upper burner and also to determine the coal supplying rate and the ratio of oxidizer weight to coal weight supplied to the lower burner. Based on the signals, the reaction region control means controls a coal flow rate regulating means 92 and oxidizer flow rate regulating means 94 for the upper burner and also controls a coal flow rate regulating means 93 and oxidizer flow rate regulating means 95 for the lower burner. In this case, the coal supplying rates are derived from the following equations.

(Coal flow rate to upper burner)
=F.(Total coal flow rate)
(Coal flow rate to lower burner)
=(Total coal flow rate)-(Coal flow rate to upper burner)

Where the function F is generally expressed by a linear expression having a negative gradient which is derived from the heat balance of the experimental values shown in FIG. 2 and measured values. The special effect of the embodiment is in that since the pressurized air produced by the compressor of the gas turbine 85 is used, the energy for pressurizing the oxidizer and the pressurized nitrogen can be decreased and accordingly the efficiency of the overall system can be improved.

Figure 7:
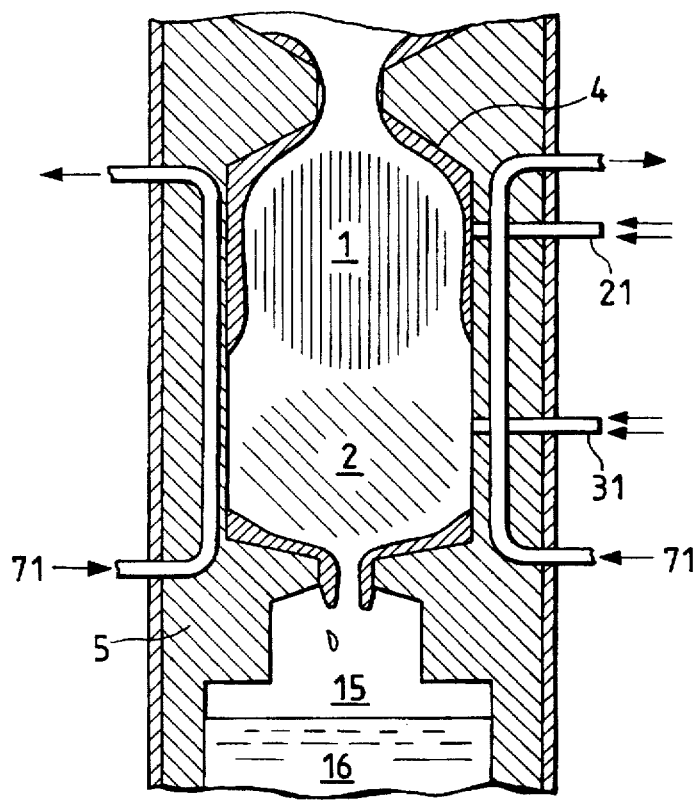
FIG. 7 is a partial cross-sectional vertical view of another embodiment of a coal gasification reactor in accordance with the present invention.

FIG. 7 shows an embodiment where the reactor wall is a water cooled wall, cooled by cooling water 71. Since by employing the water cooled wall the reactor wall is sufficiently cooled and the melting slug 5 prevents erosion of the reactor wall, this embodiment has an effect in that reliability and durability of the reactor wall are improved.

Figure 8:
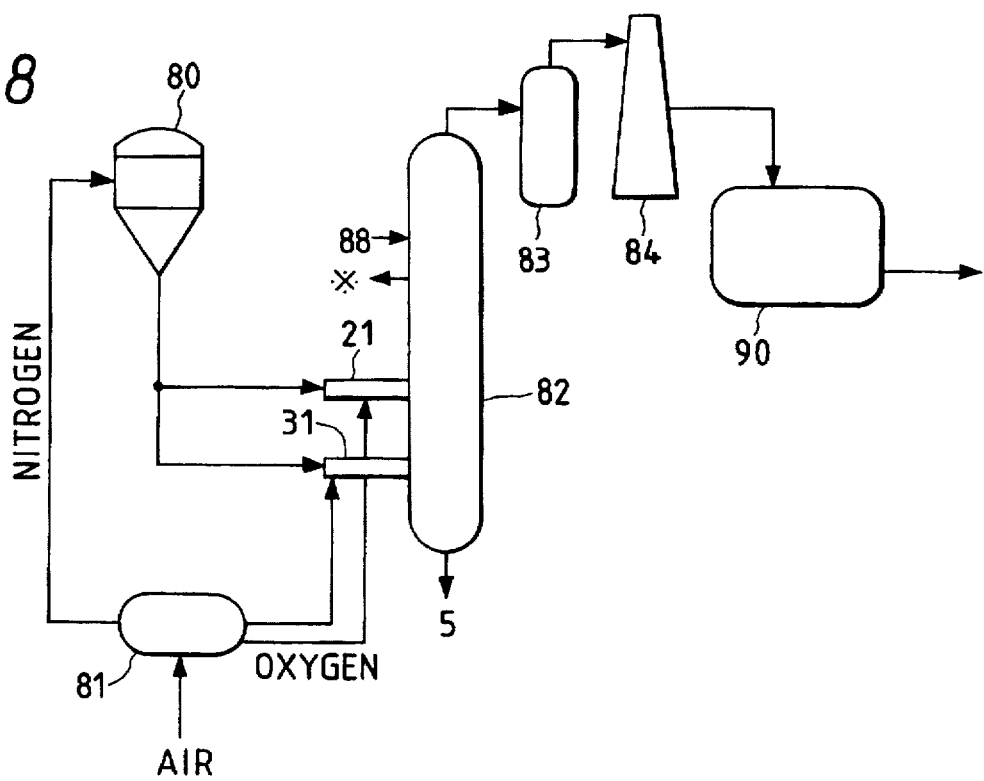
FIG. 8 is a diagram showing the construction of an embodiment of a coal gasification fuel cell electric power generating system in accordance with the present invention.

FIG. 8 is a diagram showing the construction of an embodiment of a coal gasification fuel cell electric power generating system. The product gas formed in the coal gasification reactor 82 passes through a scrubber 83 and a desulfurizer 84 to be removed dust and sulphur in the product gas, and then electric power is generated by a fuel cell 90. Air is transferred to an oxygen generating equipment 81 to be separated into nitrogen and oxygen. The nitrogen is used for the pressurizing nitrogen at a coal hopper 80, and the oxygen is used as the oxidizer for the gasification reactor. Although the detailed process of controlling the volumes of the upper and the lower reaction regions depending on the load is not described here, the process is the same as that of FIG. 6. The special effect of this embodiment is in that the efficiency of the overall system can be improved by using the fuel cell which is one of high efficiency systems.

Figure 9:
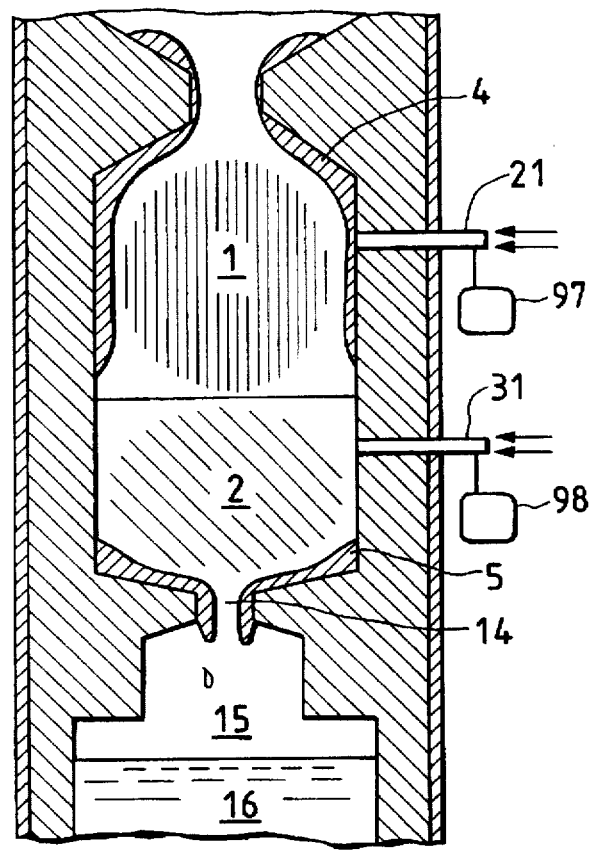
FIG. 9 is a partial cross-sectional vertical view of a still other embodiment of a coal gasification reactor in accordance with the present invention.

A gasification reactor shown in FIG. 9 is characterized by an upper nozzle driving device 97 and a lower nozzle driving device 98. The device varies the cross-sectional area of the nozzle end to vary the injecting speed depending on the load in order to obtain a product gas having a constant composition. The special effect of the embodiment is in that the system can be simplified without any auxiliary device since the control can be performed only by mechanical operation and not by changing supplying rate of substance.

Figure 10:
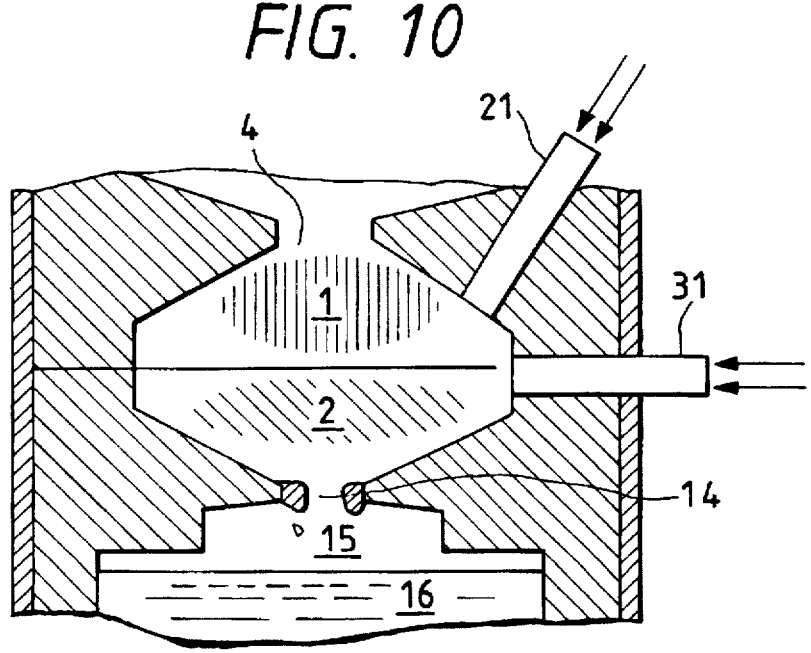
FIG. 10 is a partial cross-sectional vertical view of another embodiment of a coal gasification reactor in accordance with the present invention.

A gasification reactor of FIG. 10 will be described below. Since the gasification reactor is not of swirl flow type, the upper burner 21 is attached so as to be directing in a downward direction in order to form the upper reaction region. The lower burner 31 is attached so as to be directing in the horizontal direction. The volumes of the upper and the lower reaction regions are changed by changing the ratio of the coal flow rate supplied from the upper burner 21 to the coal flow rate supplied from the lower burner 31. In more details, as the whole load is increased, the coal flow rate supplied to the lower burner is increased and the coal flow rate supplied to the upper burner is decreased. The special effect of this embodiment is in that the volumes of the upper and the lower reaction region can be changed without forming the swirl flow in the reactor.

According to the present invention, since changes in heat generating rate and composition of product gas can be suppressed to be small even if the load changes, it is possible to stably operate a gasification electric power generating system having a coal gasification reactor as a main apparatus at a load fluctuation condition.

What is claimed is:

1. An entrained bed gasification reactor comprising burners for forming combustible gas by injecting coal and oxidizer into an upper and a lower gasification chambers, a slag ejection port reducing the cross-section area at the bottom, and coal-oxidizer flow rate control means for setting the ratio of the coal to the oxidizer supplied to said upper burner to such a value that the temperature does not exceed the melting temperature of the coal ash and setting the ratio of the coal to the oxidizer supplied to said lower burner to such a value that the temperature exceeds the melting temperature of the coal ash, which further comprises reaction region control means for changing the ratio of the volume of an upper reaction region formed by said upper burner to the volume of a lower reaction region formed by said lower burner depending on the load so that the ratio of the volume of the lower reaction region is increased as the load increases.

2. An entrained bed gasification reactor according to claim 1, which comprises a plurality of burners in each of the upper reaction region and the lower reaction region in said gasification chamber, the burners being directed in the tangential direction of the gasification chamber so as to form swirl flow of the product gas.

3. An entrained bed gasification reactor according to claim 2, wherein said reaction region control means is a means for changing the ratio of the swirl forces by said upper burners to said lower burners depending on the load so that the swirl force by the lower burners is strengthened as the load increases.

4. An entrained bed gasification reactor according to claim 2, wherein said reaction region control means is a means for changing the ratio of the flow rate of the coal supplied to said upper burners to the flow rate of the coal supplied to said lower burners so that the ratio of the flow rate of the coal supplied to the lower burners is increased as the load increases.

5. An entrained bed gasification reactor according to claim 2, wherein said reaction region control means is a means for changing the ratio of the injecting speed of the coal and oxidizer supplied to said upper burners to the injecting speed of the coal and oxidizer supplied to said lower burners depending on the load so that the injecting speed of the coal and oxidizer supplied to the lower burners is increased as the load increases.

6. An entrained bed gasification reactor according to claim 2, wherein a steam nozzle is provided near said lower burners, said reaction region control means being a means for changing the flow rate of the steam supplied to said steam nozzle depending on the load so that the flow rate of the steam is increased as the load increases.

7. An entrained bed gasification reactor according to claim 3, which comprises a steam nozzle provided near said lower burners, and means for changing the flow rate of the steam supplied to said steam nozzle depending on the load so that the flow rate of the steam is increased as the load increases.

8. An entrained bed gasification reactor according to claim 2, wherein an air nozzle is provided near said lower burners, said reaction region control means being a means for changing the flow rate of the air supplied to said air nozzle depending on the load so that the flow rate of the air is increased as the load increases.

9. An entrained bed gasification reactor according to claim 3, which comprises an air nozzle provided near said lower burners, and means for changing the flow rate of the air supplied to said air nozzle depending on the load so that the flow rate of the air is increased as the load increases.

10. An entrained bed gasification reactor comprising burners for forming combustible gas by injecting coal and oxidizer into an upper and a lower gasification chambers, a slag ejection port reducing the cross-section area at the bottom, and coal-oxidizer flow rate control means for setting the ratio of the coal to the oxidizer supplied to said upper burner to such a value that the temperature does not exceed the melting temperature of the coal ash and setting the ratio of the coal to the oxidizer supplied to said lower burner to such a value that the temperature exceeds the melting temperature of the coal ash, which further comprises reaction region control means for changing the ratio of the volume of an upper reaction region formed by said upper burner to the volume of a lower reaction region formed by said lower burner depending on the load so that the ratio of the volume of the lower reaction region is increased as the load increases;

wherein said reaction region control means is a means for keeping the oxidizer-to-coal ratio constant as a whole in such a manner that the oxidizer-to-coal ratio supplied to the upper burners is kept constant and the oxidizer-to-coal ratio supplied to the lower burner is decreased as the load increases by increasing the ratio of the flow rate of the coal supplied to the lower burners and decreasing the ratio of the flow rate of the coal supplied to the upper burners.

11. A method of entrained bed gasification in which coal and oxidizer are injected from burners provided at each of the upper region and the lower region of a gasification chamber having a product gas ejecting port reducing the cross-sectional area in the top and a slag ejecting port reducing the cross-sectional area in the bottom, the coal and the oxidizer are reacted to form combustible gas by setting the oxidizer-to-coal ratio to the upper burner so that the temperature does not exceed the coal ash melting temperature and by setting the oxidizer-to-coal ratio to the lower burner so that the temperature exceeds the coal ash melting temperature, wherein the ratio of the volume of an upper reaction region formed by said upper burner to the volume of a lower reaction region formed by said lower burner is changed depending on the load so that the ratio of the volume of the lower reaction region is increased as the load increases.

12. A method of entrained bed gasification according to claim 11, which comprises a plurality of burners in each of the upper reaction region and the lower reaction region in said gasification chamber, the burners are directed in the tangential direction of the gasification chamber so as to form swirl flow of the product gas.

13. A method of entrained bed gasification according to claim 11, wherein the volume ratio of the lower reaction region formed by the lower burner is increased as the load increases by increasing the ratio of the flow rate of the coal supplied to said upper burner to the flow rate of the coal supplied to said lower burner so that the ratio of the flow rate of the coal supplied to the lower burner is increased.

14. A method of entrained bed gasification according to claim 11, wherein the volume ratio of the lower reaction region formed by the lower burner is increased as the load increases by increasing the ratio of the injecting speed of the coal and oxidizer supplied to said upper burner to the injecting speed of the coal and oxidizer supplied to said lower burner depending on the load so that the injecting speed of the coal and oxidizer supplied to the lower burner is increased.

15. A method of entrained bed gasification according to claim 11, wherein steam is supplied near said lower burner, the flow rate of the steam supplied being changed depending on the load so that the flow rate of the steam is increased as the load increases.

16. A method of entrained bed gasification according to claim 11, wherein air is supplied near said lower burners, the flow rate of the air supplied being changed depending on the load so that the flow rate of the air is increased as the load increases.

17. A method of entrained bed gasification in which coal and oxidizer are injected from burners provided at each of the upper region and the lower region of a gasification chamber having a product gas ejecting port reducing the cross-sectional area in the top and a slag ejecting port reducing the cross-sectional area in the bottom, the coal and the oxidizer are reacted to form combustible gas by setting the oxidizer-to-coal ratio to the upper burner so that the temperature does not exceed the coal ash melting temperature and by setting the oxidizer-to-coal ratio to the lower burner so that the temperature exceeds the coal ash melting temperature, wherein the ratio of the volume of an upper reaction region formed by said upper burner to the volume of a lower reaction region formed by said lower burner is changed depending on the load so that the ratio of the volume of the lower reaction region is increased as the load increases;

wherein said reaction region control means is a means for keeping the oxidizer-to-coal ratio constant as a whole in such a manner that the oxidizer-to-coal ratio supplied to the upper burner is kept constant and the oxidizer-to-coal ratio supplied to the lower burner is decreased as the load increases by increasing the ratio of the flow rate of the coal supplied to the lower burner and decreasing the ratio of the flow rate of the coal supplied to the upper burner.

18. A coal gasification fuel cell electric power generating system comprising an entrained bed gasification reactor according to claim 1.

19. A coal gasification combined electric power generating system comprising an entrained bed gasification reactor according to claim 1.

20. An entrained bed gasification reactor according to claim 4, which comprises a steam nozzle provided near said lower burners, and means for changing the flow rate of the steam supplied to said steam nozzle depending on the load so that the flow rate of the steam is increased as the load increases.

21. An entrained bed gasification reactor according to claim 5, which comprises a steam nozzle provided near said lower burners, and means for changing the flow rate of the steam supplied to said steam nozzle depending on the load so that the flow rate of the steam is increased as the load increases.

22. An entrained bed gasification reactor according to claim 4, which comprises an air nozzle provided near said lower burners, and means for changing the flow rate of the air supplied to said air nozzle depending on the load so that the flow rate of the air is increased as the load increases.

23. An entrained bed gasification reactor according to claim 5, which comprises an air nozzle provided near said lower burners, and means for changing the flow rate of the air supplied to said air nozzle depending on the load so that the flow rate of the air is increased as the load increases.

24. A method of entrained bed gasification according to claim 12, wherein steam is supplied near said lower burners, the flow rate of the steam supplied being changed depending on the load so that the flow rate of the steam is increased as the load increases.

25. A method of entrained bed gasification according to claim 13, wherein steam is supplied near said lower burner, the flow rate of the steam supplied being changed depending on the load so that the flow rate of the steam is increased as the load increases.

26. A method of entrained bed gasification according to claim 14, wherein steam is supplied near said lower burner, the flow rate of the steam supplied being changed depending on the load so that the flow rate of the steam is increased as the load increases.

27. A method of entrained bed gasification according to claim 12, wherein air is supplied near said lower burners, the flow rate of the air supplied being changed depending on the load so that the flow rate of the air is increased as the load increases.

28. A method of entrained bed gasification according to claim 13, wherein air is supplied near said lower burner, the flow rate of the air supplied being changed depending on the load so that the flow rate of the air is increased as the load increases.

29. A method of entrained bed gasification according to claim 14, wherein air is supplied near said lower burner, the flow rate of the air supplied being changed depending on the load so that the flow rate of the air is increased as the load increases.

* * * * *